2,829,134
Patented Apr. 1, 1958

2,829,134

PROCESS FOR POLYMERIZING VINYL CHLORIDE IN AQUEOUS EMULSION

Robert De Coene, Ixelles-Brussels, Belgium, assignor to Solvic Société Anonyme, Brussels, Belgium, a Belgian company No Drawing. Application March 26, 1954
Serial No. 419,083

Claims priority, application Netherlands March 31, 1953

5 Claims. (Cl. 260—92.8)

This invention relates to an improved process for polymerizing vinyl chloride in aqueous emulsion.

It is known that polymerization of vinyl compounds may be carried out in aqueous emulsion in the presence of a suitable emulsifying agent and of one or more catalyists which are soluble in the aqueous phase. When polymerization is carried out in this manner a relatively concentrated and stable latex is obtained which may be handled and dried without risk of premature breaking of the emulsion.

The known processes suffer however from serious drawbacks brought about by the complexity of the catalytic systems that are used therein. In fact, the water soluble catalytic systems are very sensitive to minute traces of impurities such as heavy metals and oxygen.

Therefore the known processes do not yield reproducible results, since the concentration of the minute traces of impurities in the reaction medium cannot be practically determined and controlled within sufficiently close limits. Tests carried out under apparently identical conditions indicate considerable differences in the time required for the reactions to take place, changes in the behavior of the reactions generally and varying difficulties to hold the temperature of polymerization at its pre-selected value. Frequently polymerization reactions take place violently, the temperature of the polymerizing emulsion rising sometimes by more than 10° C. above the set working temperature. Heterogeneity of the produced polymers and disorganization of the work in the factory are thus brought about.

It is further known that polymerization in the presence of catalysts that are soluble in the monomeric vinyl chloride does not suffier from the above mentioned disadvantages; but the products so formed always contain—even if excess of emulsifying agent be used—in addition to a diluted latex, varying proportions of granules, of sediments or of the polymer in block form, which will cause an abundant crust formation in the autoclave.

In contradistinction to the prior art, the present invention enables to produce a stable latex that may be readily dried in spray driers with pneumatic or mechanical pulverization without the risk of premature coagulation.

The invention consists in a process for polymerizing vinyl chloride, which is characterized in that there is used at least one water insoluble organic catalyst, and an emulsifying agent in an amount of less than 2% by weight calculated on the weight of the monomeric vinyl chloride, and in that said monomer is supplied to the autoclave continuously at such rate that the pressure in the autoclave is as high as possible but lower than the saturation pressure of the monomer at the working temperature.

Suitable water insoluble organic catalysts are organic peroxides such as benzoyl peroxide, acetyl peroxide, lauroyl peroxide, etc. or nitrogen-containing compounds such as azodiisobutyronitrile, azodiisovaleronitrile, etc.

The temperature at which polymerization may be carried out is not critical. It may be comprised between 30° C. and 100° C., but it is preferable to work between 45° C. and 55° C.

The emulsifying agents commonly used in emulsion polymerization may be employed in the process according to the invention. Soaps such as the sodium or potassium salts of palmitic, stearic, oleic and/or lauric acid may be used.

The ammonium salts of mono-basic acids having at least 8 carbon atoms, such as ammonium stearate and ammonium laurate may be used. Other compounds which are also good emulsifying agents include the alkyl and alkylene sulphates or sulphonates of alkali metals, especially those having 10 to 20 carbon atoms in the hydrocarbon chain, such as for instance sodium or potassium lauryl sulphate, or sodium or potassium oleyl sulphonates or sodium or potassium stearyl sulphonates; the alkali metal salts of sulphonated oils, for instance of turkey red oil or sulphonated mineral oils, etc.

The emulsifying agent may be introduced into the autoclave before the beginning of the polymerization, but it may also be introduced gradually at the same time as the monomeric vinyl chloride.

The emulsifying agent may alternatively be prepared in situ by saponifying an organic acid by means of an organic or inorganic base.

The continuous introduction of the monomeric vinyl chloride into the autoclave, may be carried out by connecting the vapor space of the polymerization autoclave to a constant pressure vessel which contains liquid vinyl chloride maintained a a temperature slightly below that selected for the carrying out of the polymerization.

The invention will be illustrated in greater detail by mean of the following specific examples.

*Example 1*

Monomeric vinyl chloride is introduced in a continuous manner in an autoclave of 5 liters capacity containing 2 liters of water, 12 gms. of benzoyl peroxide and 12 gms. of sodium stearate, and maintained at 50° C., in such a manner that the pressure in the autoclave is maintained between 7.0 and 7.15 kg. per cm.$^2$.

1 kg. of monomeric vinyl chloride is introduced within nine and a half hours.

The reaction is thereafter stopped and the monomer that has not taken part in the reaction is removed. The product obtained is in the form of a stable latex containing about 40% of polyvinyl chloride. The latex does not contain any solid component which is likely to settle out rapidly. The autoclave is found to be free of any crust formation.

*Example 2*

The procedure of Example 1 is followed, but the quantity of oxygen in the autoclave is varied. Such repeated tests with varying quantities of oxygen, always yielded results equal to those of Example 1.

I claim:

1. A process for polymerizing vinyl chloride in aqueous emulsion which comprises introducing vinyl chloride monomer into a polymerization zone containing at least one water insoluble organic catalyst effective to polymerize monomeric vinyl chloride, and an emulsifying agent in an amount of at least two percent by weight calculated on the weight of the monomeric vinyl chloride introduced, said monomer being introduced continuously at a rate such that the pressure in the polymerization zone is as high as possible but lower than the saturation pressure of the monomeric vinyl chloride at the polymerization temperature, whereby said monomer remains in gaseous form at all times and a stable latex of polyvinyl chloride is formed, interrupting introduction of said monomer, and removing the latex from said zone.

2. A process as defined in claim 3, wherein the water-insoluble organic catalyst is an organic peroxide selected from the group consisting of benzoyl peroxide, acetyl peroxide and lauroyl peroxide.

3. A process as defined in claim 1, wherein the water-insoluble organic catalyst is selected from the group consisting of azodiisobutyronitrile and azodiisovaleronitrile.

4. A process as defined in claim 1, wherein polymerization is carried out at a temperature between about 45° C. and about 55° C.

5. A process for polymerizing vinyl chloride in aqueous emulsion which comprises introducing vinyl chloride monomer into a polymerization zone containing about 12 parts by weight of benzoyl peroxide, at least about 20 parts by weight of sodium stearate with about 2000 parts by weight of water at about 50° C. a total of about 1000 parts by weight of said vinyl chloride monomer being supplied continuously at a rate such that the pressure in the polymerization zone is maintained between about 7.0 and about 7.15 kg. per cm.$^2$ at said temperature, whereby said monomer remains in gaseous form at all times and a stable latex of polyvinyl chloride is formed, interrupting introduction of said monomer, and removing the latex from said zone.

References Cited in the file of this patent

UNITED STATES PATENTS 2,511,593    Lightfoot _____ June 13, 1950

OTHER REFERENCES

"Vinyl and Related Polymers," Schildknecht Wiley & Sons Inc., New York, 1952, p. 395.